Dec. 10, 1929.　　　G. R. NAPIER　　　1,738,918

METHOD OF CUTTING AND APPARATUS THEREFOR

Original Filed May 19, 1925　　5 Sheets-Sheet 1

INVENTOR
George R. Napier
BY
Richey, Slough Heath
ATTORNEY

Dec. 10, 1929.  G. R. NAPIER  1,738,918
METHOD OF CUTTING AND APPARATUS THEREFOR
Original Filed May 19, 1925   5 Sheets-Sheet 2

INVENTOR
George R. Napier
BY
Richey, Slough & Watt
ATTORNEY

Dec. 10, 1929.  G. R. NAPIER  1,738,918
METHOD OF CUTTING AND APPARATUS THEREFOR
Original Filed May 19, 1925   5 Sheets-Sheet 3

Fig 3

INVENTOR
George R. Napier
BY
Richey, Slough & Watts
ATTORNEY

Dec. 10, 1929.    G. R. NAPIER    1,738,918
METHOD OF CUTTING AND APPARATUS THEREFOR
Original Filed May 19, 1925    5 Sheets-Sheet 4

INVENTOR
George R. Napier
BY Richey, Slough & Watts
ATTORNEY

Dec. 10, 1929.                  G. R. NAPIER                    1,738,918
                    METHOD OF CUTTING AND APPARATUS THEREFOR
                    Original Filed May 19, 1925    5 Sheets-Sheet 5

INVENTOR
George R. Napier
BY
Richey Slough & Watts
ATTORNEY

Patented Dec. 10, 1929

1,738,918

UNITED STATES PATENT OFFICE

GEORGE R. NAPIER, OF CLEVELAND, OHIO, ASSIGNOR, BY MESNE ASSIGNMENTS, TO THE GUARDIAN TRUST COMPANY, OF CLEVELAND, OHIO, A CORPORATION OF OHIO

METHOD OF CUTTING AND APPARATUS THEREFOR

Application filed May 19, 1925, Serial No. 31,423. Renewed October 22, 1928.

This invention relates to the art of cutting materials. It relates more particularly to a method of and apparatus for cutting various materials by which they may be cut to any desired state of fineness without crushing the materials or extracting or pressing out juices or liquids contained therein, and by which the cut materials are mixed during the cutting and may, if desired, be more thoroughly and uniformly mixed either during or after, or both during and after, the cutting operation.

My method of cutting may be described briefly as comprising a method in which the materials to be cut are subjected to centrifugal force, preferably in a vertical plane, and wherein they are cut by cutting means which preferably are caused to operate on the material after the feeding operation has been substantially completed, the cutting means extending radially into, but not entirely through, all the material. It also includes a mixing of the materials being cut by the cutting means which takes place simultaneously with the cutting, as well as a thorough and complete mixing of the cut material either immediately after, or if desired, during the cutting operation.

The apparatus of my invention may be described briefly as comprising a rotatable container which will retain material to be cut and in which the material may be subjected to centrifugal force, preferably in a substantially vertical plane. Means are provided for rotating the container and also for actuating cutting means which operatively engage with and cut the material in the container without, however, coming into actual contact with the inner surface of the container. Preferably a rotary cutting means consisting of one or more cutters and capable of movement toward or away from the inner surface of the container is employed. Liners of wood or similar materials for the container are unnecessary since the cutters do not run against or contact with the container.

My invention will be described more fully hereinafter, reference being had to the drawings accompanying and forming a part of this specification in which—

In practicing my method of cutting materials, I first feed the materials to be cut into a container which can be rotated, and therein subject the materials to the action of centrifugal force so as to cause the material to lie in contact with the inner wall of the container and rotate therewith. When the material is being rotated with the container and is under the influence of centrifugal force, I bring cutting means into contact with the material, maintaining the cutting means out of substantial contact, however, with the inner surface of the container. In other words, the cutting means extends radially into, but not entirely, through all the material to be cut. Rotation of the container and the material carried thereby brings the material to be cut into contact with the cutting means about once every rotation of the container and results in a cutting of all the materials to the desired state of fineness within a time dependent in part upon the speed of rotation of the container and the number of cutting edges engaging the material.

I have discovered that when the cutting means is disposed just out of contact with the inner surface of the container, rotated at a faster speed than the speed of the container and moved transversely of the container while rotating, a pronounced mixing, turning over or agitating of the materials being cut takes place. In the case of meat this mixing is so thorough that substantially all the meat is cut uniformly, although the cutting means never extends radially entirely through all of the material. For many substances, this mixing or agitating action of the cutters may be all that is required, but in other instances where a more thorough and complete mixing and intermingling of the cut substances is required, an additional agitator or mixer may be employed. After the completion of the cutting and mixing operations, the material is discharged from the container.

I have also discovered that when the space between the cutting means and the inner surface of the container is maintained within certain limits, materials to be cut will be cut to substantially uniform size but that when this space is increased beyond the maximum here specified the material is cut non-uniformly regardless of the nature of the mixing. The space between the inner surface of the container and the cutting means should not be less than about $\frac{1}{32}$nd of an inch when the parts are at rest and should not exceed more than about $\frac{1}{4}$th of an inch under similar conditions, a space of about $\frac{1}{16}$th of an inch being satisfactory for most materials to be cut either with or without mixing in addition to that accomplished by the motion of the knives. Throughout this application and claims I have employed the term "just out of contact with the inner surface of the container" to refer to the space above described or to such a space between the knives and container as will insure substantially uniform cutting of the materials to be cut at all times.

The device shown in the figures may be described as comprising a material retaining container or drum 1 which is mounted for rotation preferably in a vertical plane. Cutting means designated by the character 2 are provided within the container in position to cut material carried by the container. This cutting means is movable toward and away from the inner surface 1$^a$ of the container and may be withdrawn completely out of contact with the material carried by the container, but is at all times maintained out of substantial contact with and does not run against the inner surface 1$^a$ of the container 1. Preferably a space equal to an ordinary sheet of paper is maintained between the cutting means and the inner surface of the container.

The material retaining container 1, as shown, consists of a circular drum having an inner surface 1$^a$ and peripheral side flanges 3 extending inwardly at each end and in the plane of the drum 1, which flanges are preferably continued in a direction generally transverse to the plane of rotation of the drum and are provided at their outer extremities with substantially parallel oppositely extending flanges 5. This drum 1 may consist of a single element or part, or as shown, may be made up of two substantially circular cooperating sections secured together as by securing means 6. The drum is provided on its outer surface with annular tracks 7 which may have various cross sectional configurations but, as shown, have substantially wedge-shaped outer surfaces 7$^a$ to seat in correspondingly grooved rollers 8 on shafts 9 and 10 extending substantially parallel to the axis of rotation of the drum and each rotatably mounted in the drum support. The drum support may conveniently comprise a housing 11 for the drum, the marginal sides 12 of which are disposed between and are overlapped by the inwardly and outwardly extending flanges 3 and 5 respectively of the drum. This housing 11 is preferably split horizontally at about the center of the drum so that the upper half 13 of the housing may be removed to expose the drum. Securing means 14 hold the two sections of the housing in assembled relation. Preferably the two shafts 9 and 10, each provided with supporting rollers 8, furnish the only support and driving means for the drum. To provide for slight inaccuracies in alignment of the annular tracks 7 certain of the rollers 8 are shiftable longitudinally on the shafts so that the rollers will engage at all times with the annular tracks 7 whether or not these tracks are exactly parallel.

Means for rotating the drum may be carried by the housing. As shown it consists of a motor 17 supported on one end of the lower portion of the housing 11 within a housing 16 and connected by a belt, chain or suitable means (not shown) with a pulley or gear 19 keyed to one of the axles 9 which carry the drum. Power from the motor is transmitted through the driving means to the axle and thence to the drum through the grooved rollers 8.

Figure 1:
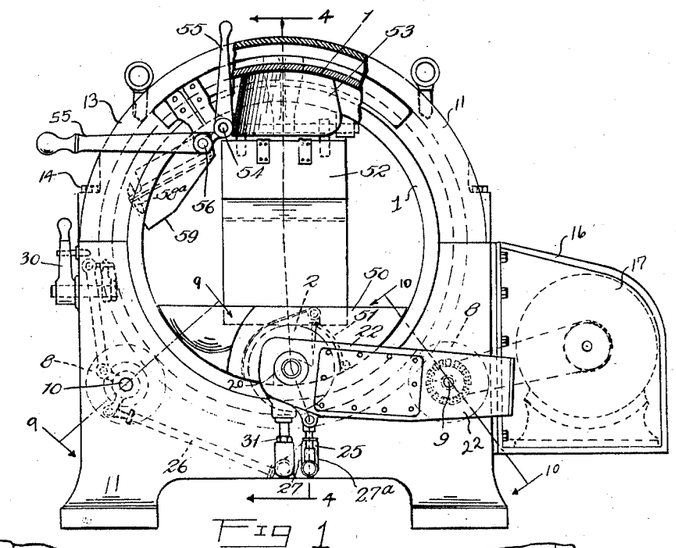
Figs. 1 and 2 are, respectively, right and left side elevations of one form of device embodying my invention and in which my method of cutting materials may be carried out.
Figure 2:
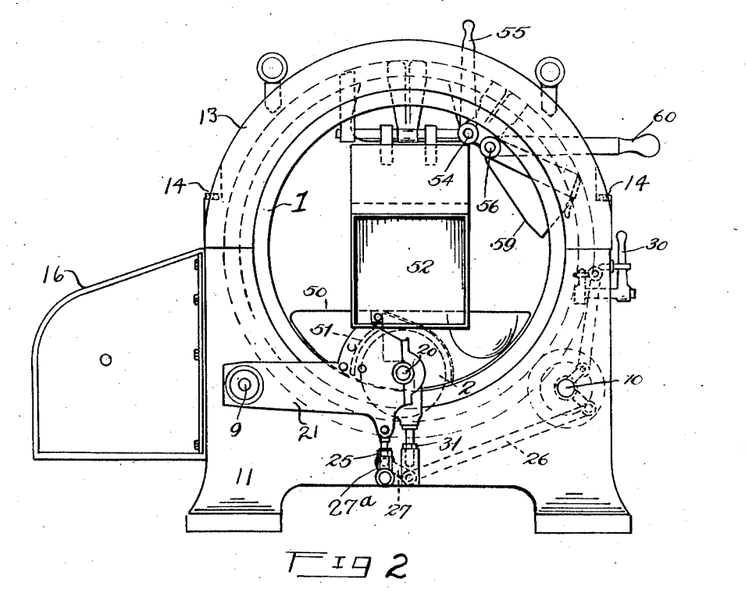
Figure 3:
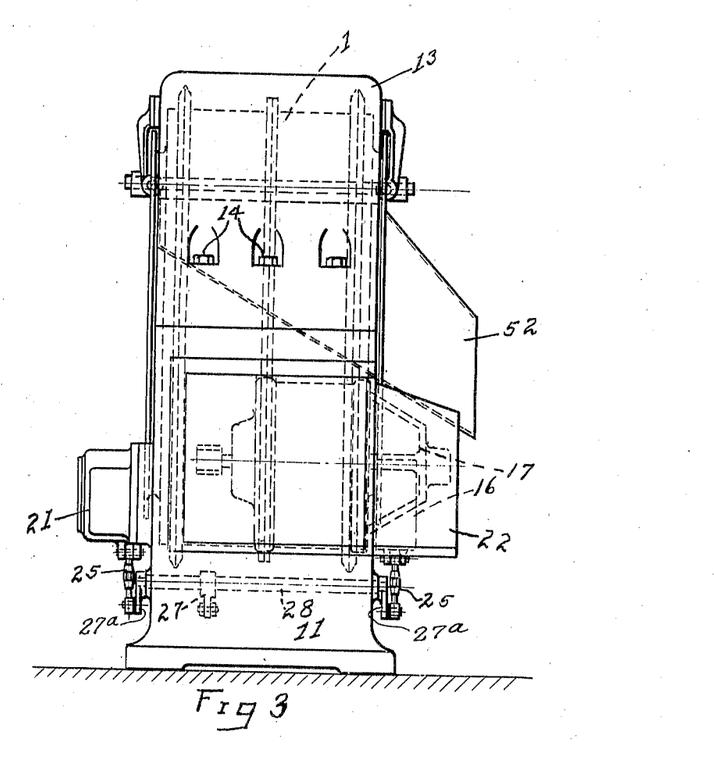
Fig. 3 is an end elevation of the device shown in Fig. 1.
Figure 4:
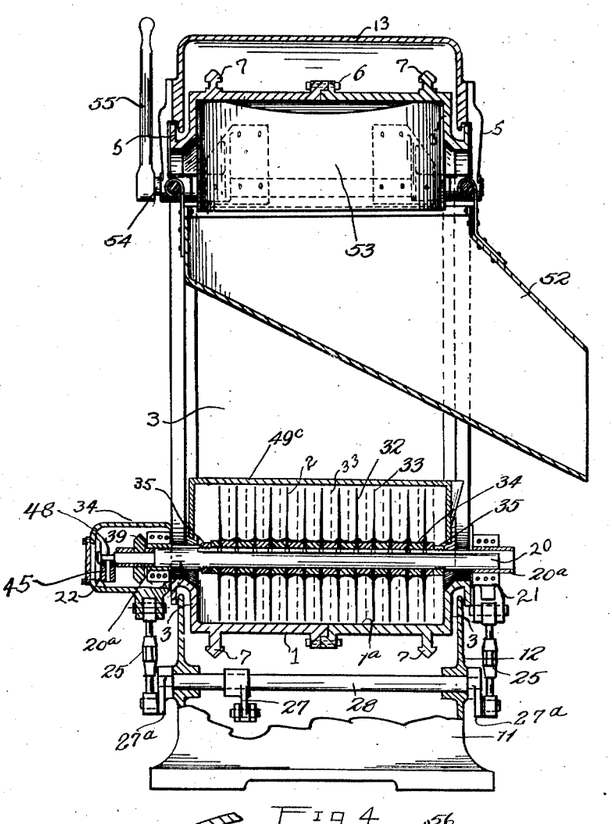
Fig. 4 is a vertical section taken substantially on line 4—4 of Fig. 1.
Figure 5:
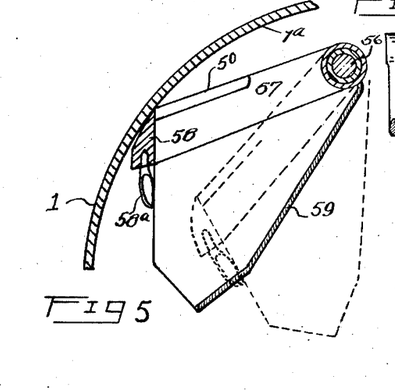
Figs. 5 and 6 are, respectively, sectional and side elevational views of the mixing device shown in Fig. 1.
Figure 6:
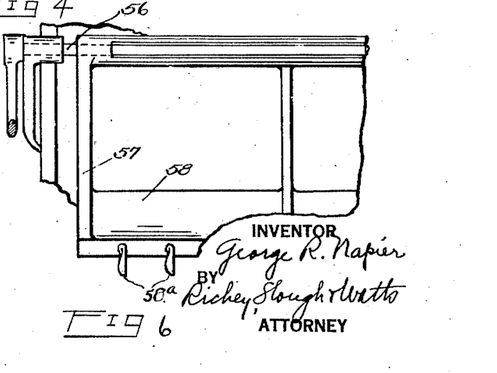

The cutting means illustrated comprises one or more cutting blades 2, preferably in the form of discs, carried on a shaft 20 disposed substantially parallel to the axis of the drum. This cutter shaft 20 extends laterally beyond either side of the drum and housing and is supported at its ends in suitable bearings 20$^a$ carried by arms 21 and 22. The arm 21 is rotatably supported on one end of shaft 9 while arm 22 is rotatably supported at one end in suitable opening 23 in housing 11 and about the bearing 24 for the end of shaft 9. At their other ends these arms 21 and 22 are carried by adjustable links 25 which are connected to crank arms 27ª secured to a cross shaft 28 rotatably mounted in the housing 11 beneath the drum. Lever 26 is secured to shaft 28 by a crank arm 27 and joined through a series of levers and rods to an operating handle 30 positioned outside of the housing 11 and at one end thereof, as more clearly shown in Fig. 2. Movement of this handle 30 in one direction is transmitted through the levers and rods to the cutter shaft and acts to move the cutter shaft and cutters away from the inner surface of the drum. Corresponding movement of the handle in the opposite direction brings the cutters toward the inner surface of the drum. Adjustable stops 31 are carried by the housing 11 to afford a rest for the arms 21 and 22. These stops, by limiting the movement of the cutter shaft 20 carrying arms 21 and 22, serve to determine the amount of space to be maintained between the cutters and the inner surface of the drum.

The cutters illustrated consist of thin metal discs 32 having sharp edges 33, the center of the disc being perforated to slide over the cutter shaft 20. Each blade has disposed on either side thereof a filler block 34 which is preferably keyed to the shaft to prevent rotation thereof relative to the shaft. Lock nuts 35 engaging the filler blocks at opposite ends of the cutting device secure the discs and filler blocks with any desired degree of frictional engagement but preferably are so adjusted that the cutters normally rotate with the shaft 20 but any cutter may cease rotating if it encounters any obstacle which would be likely to break the cutter if it could not stop.

It will be understood that I may substitute for the cutter discs shown, a disc having cutting teeth instead of a continuous edge or I may substitute for the cutter shaft and discs shown, a roll provided with teeth or other surface projections for breaking up, grinding, crushing or cutting certain materials.

The cutter shaft is rotated by a series of gears housed within one of the cutter shaft carrying arms 22. This gearing, as shown, comprises a bevel gear 35ª fixed to one end of drum drive shaft 9 which meshes with another bevel gear 36 secured to a shaft 37 extending lengthwise within the arm 22 and carrying at its opposite end a similar bevel gear 38 which in turn meshes with a fourth bevel gear 39 keyed to the cutter shaft 20 against rotation relative thereto but in a manner to permit movement of the cutter shaft lengthwise therethrough. Rotation of the drum drive shaft 9 is in this manner transmitted to the cutter drive shaft and the cutters and drum are thus rotated simultaneously and with any desired predetermined ratio of speeds.

It is desirable that the cutter shaft 20 be mounted for movement transversely of the drum, and to accomplish this purpose in one preferred way, means have been provided for moving the cutter shaft with its cutters back and forth across the drum while the cutters are rotating and preferably while the drum also is rotating. It will be understood that although the cutter shaft may be moved transversely of the drum, whether the drum is rotating or not and whether the cutters are rotating or not, very desirable results are obtained when these parts are all in motion simultaneously.

Figure 7:
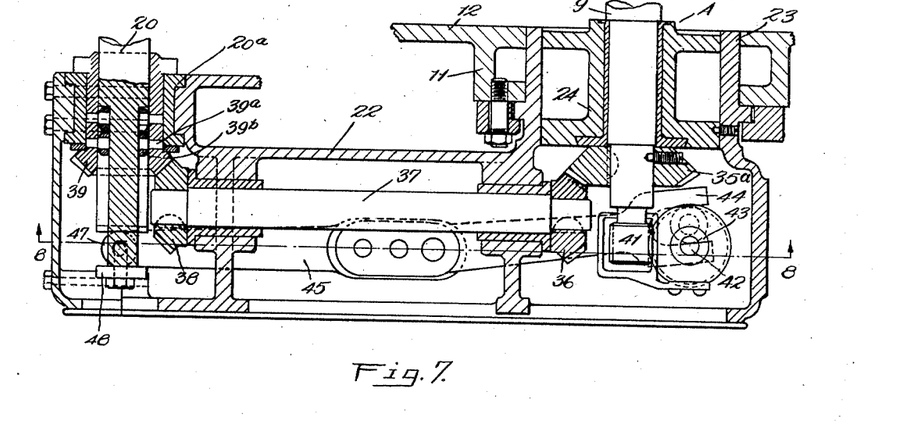
Fig. 7 is a horizontal section on line 7—7 of Fig. 8 and showing means for actuating the cutting means.
Figure 8:
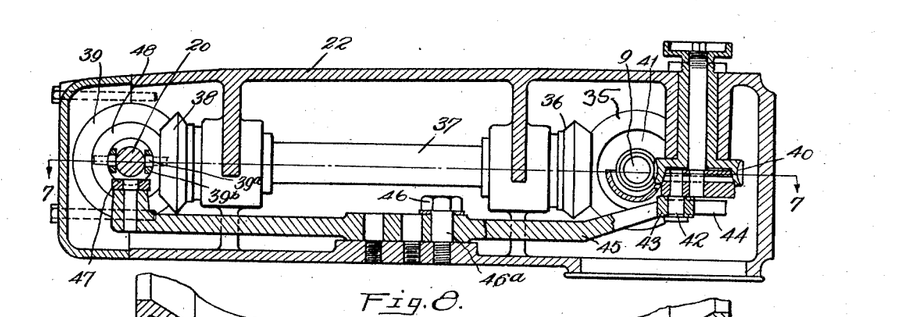
Fig. 8 is a vertical section of the cutter actuating means taken on line 8—8 of Fig. 7.
Figure 9:
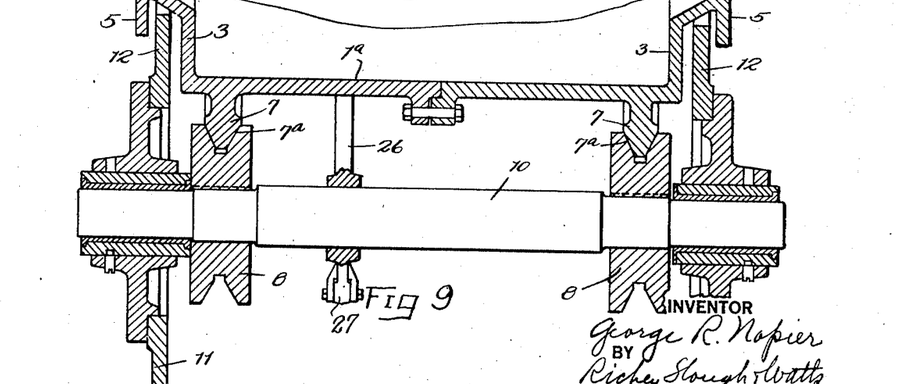
Fig. 9 is an enlarged sectional view taken on line 9—9 of Fig. 1 showing one drum supporting shaft.
Figure 10:
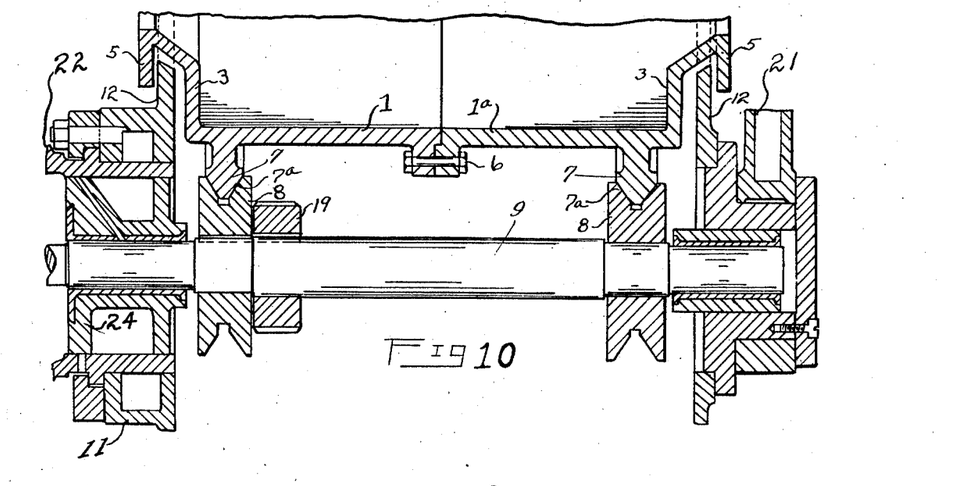
Fig. 10 is a view similar to Fig. 9 taken on line 10—10 of Fig. 1 and showing the other drum supporting roller.

Means for actuating the cutter shaft and cutters transversely of the drum is also housed within the cutter shaft carrying arm 22. This means, as shown, comprises a gear 40 adjustably mounted in the arm 22 and disposed to engage with a gear 41 keyed to the drive shaft 9. This gear 40 carries an eccentrically mounted pin 42 equipped with a roller 43 which engages within the forked end 44 of an arm 45, which is rotatably supported near its middle by a stud 46 removably held in one of several openings 46ª in the side of the cutter shaft carrying arm 22. The other end of the arm 45 is provided with a roller 47 which fits between substantially parallel surfaces of cutter shaft 20 and a member 48 secured to the adjacent end of cutter shaft 20. It will be noted, by referring to Fig. 7 that the bevel gear 39 on the cutter shaft 20 is keyed thereto by key pins 39ª having roller surfaces 39ᵇ to permit the shaft 20 to move freely through the bevel gear 39 in response to the movement of the arm 45.

Rotation of the shaft 9 rotates the gear 40 and this gear in turn causes the eccentrically mounted pin 42 and its roller 43 to reciprocate the lever 45 back and forth about its central pivot 46 and coincident therewith to reciprocate the cutter shaft 20 lengthwise of itself.

Figure 11:
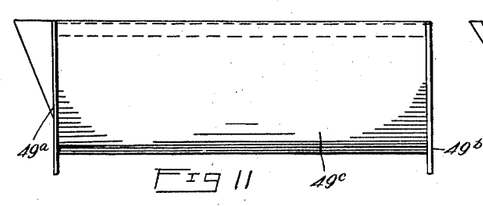
Figs. 11 and 12 are, respectively, side and end elevational views of a combined cutter guard, hopper and baffle.
Figure 12:
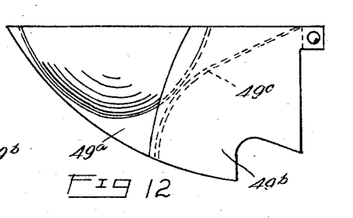

In Figs. 1, 2, 11 and 12, I have shown a combined cutter guard, hopper and baffle 49 to serve the purposes of housing the cutters, preventing the cutters from throwing cut materials out of the drum and for cooperating with the mixing means as well as the chute, table or other feeding means to collect material discharged into the drum and prevent spilling of the said material therefrom. This means, as more clearly illustrated in Figs. 11 and 12, comprises end walls 49ª and 49ᵇ secured to upstanding extensions of the shaft-carrying arms 21 and 22 and suitably recessed to bear against the cutter shaft bearings, and aligned with the drum sides but spaced slightly apart therefrom. These end walls are joined by a cross wall 49ᶜ substantially, as shown in Fig. 11, so as to be out of contact with the cutters. One end wall 49ª of this cover is curved outwardly, this portion acting to catch material passing through the mixer and being discharged again into the drum, as well as to prevent escape of material being charged into the drum from any suitable feeding means, such as a chute, table, or the like (none of which are shown). Wall 49$^b$ may also be similarly shaped if desired. Another cover comprising end walls 50 and cross wall 51 is supported by arms 21 and 22 to cover the opposite side of the cutters.

Near the top and preferably on about the vertical center line of the drum housing, I suspend means for receiving material discharged from the drum. As shown, this means comprises a chute 52 open at the inner and top end and at the outer end. A scraper 53 or other suitable means is provided on a rod 54 which is rotatably carried by the drum housing 13 so that upon rotation of a handle 55 connected therewith, the scraper may be brought into substantial contact with the inner surface of the drum to scrape or remove therefrom the material carried by the drum and to discharge the same into the chute 52. It will be understood that the chute should be sufficiently large to hold the normal content of the drum, since the scraper serves to remove all of the material from the drum in one rotation of the drum.

It will be understood that in machines of sizes other than that herein illustrated, it may be desirable to secure the chute to the housing so that it may be rotated out of the drum except during the time that the material is to be discharged and in some cases it may be desirable entirely to omit the chute.

When cutting means are employed which are spaced apart from and move relative to the inner surface of the drum transversely of the plane of rotation thereof, the material being cut is more or less thoroughly mixed by the cutting means as will presently be described, but for certain purposes it may be desirable to provide additional means for more thoroughly, intimately and uniformly mixing the contents of the drum. Such means is shown in Figs. 1, 2, 5 and 6 wherein a shaft 56 rotatably mounted in the drum housing 13 carries within the sides of the drum a skeleton frame 57, one side of which, may be brought into engagement with the inner surface of the drum. This side 58 carries projections 58$^a$ suitably shaped to spread and mix the contents of the drum which are lifted from the drum by side 58. A cover 59 suitably secured on shaft 56 is formed to return to the inner surface of the drum the material removed therefrom and agitated by frame 58 and projections 58$^a$. This agitating device is actuated by movement of a handle 60 connected to the shaft and may be operated at any time either during the cutting operation or subsequent thereto, but for most materials need be operated only for a comparatively short time in order to affect substantially uniform mixing of the material.

In operating the device above described and in carrying out my method of cutting materials, I feed the materials to be cut into the drum preferably while the drum and the cutting means are rotating and while the cutters are held out of cutting engagement with the material. After the material has been fed into the drum I bring the cutters toward the inner surface of the drum and into cutting engagement with the material and cooperating position with respect to the inner surface and sides of the drum. The material rotating with the drum under centrifugal force passes the cutters repeatedly which cut the material quickly and uniformly and mix it to a certain extent. If additional mixing is desired the mixer device 57 is employed, the material removed from the drum thereby being returned to the drum in front of the cutters. This mixing may take place during or after the cutting operation. After the material has been cut and mixed as desired it is discharged from the drum as by scraper 53 and chute 52. Obviously, two or more materials may be commingled before being fed into the drum and the ultimate uniformity of mixture of the elements thereby facilitated.

I find it desirable to maintain a more or less definite ratio between the linear speed of the drum and the linear speed of the cutting edges of the cutting devices. In the larger sized machines, a ratio of two or three times the peripheral speed of the cutting edges or more as compared with the peripheral speed of the drum has been found satisfactory while in the smaller machines, this ratio may be as high as 30 to 1 or higher if desired. By reason of the more rapid movement of the cutters, the material is moved forward toward the cutters at a relatively slow speed and the knives pass through the material with a draw-cutting motion which is conducive to cutting with a small amount of power and at the same time without crushing, squeezing out juices or liquids or heating the material being cut. With the drum and cutters rotating at the foregoing ratios and the cutters moving transversely of the drum, the broad side of the cutters tend to press laterally against the material just after it has been cut and to lift it up and/or move it transversely of the drum, thereby mixing and ensuring uniform cutting of the material. With certain materials, for example meat, this lateral movement of the cutters apparently serves to roll the meat between the cutters and drum as well as to slide it across the drum, thereby bringing the uncut portions into contact with the cutters the next time the material passes the cutters. This action is accomplished to good advantage when the cutting edges are spaced apart from the inner surface of the drum less than 1/4th of an inch and preferably less than about 1/16th of an inch and is indifferently accomplished when this space exceeds 1/4th of an inch by a material amount. The flanges 3 cooperate with the cutters in this operation and prevent the material from escaping from the drum and cutters.

In cutting certain materials which contain certain ingredients having corrosive action on the material of the drum, such, for example as pickles having vinegar or salt brine thereon, it may be desirable to form the drum of non-corrosive material or to line the drum with some such material. I have found that the rotary drum for cutting machines presents certain practical difficulties when composed of material pervious to liquids or when lined with a substance pervious to liquid, or sectional lining elements between which liquid and liquid like materials may pass into contact with the container itself. For example, a wood block lining for the drum may permit liquid to pass between the blocks into contact with the material of the drum and the blocks may also absorb the liquid with resultant swelling of the blocks which may interfere with the proper operation of the cutting devices and necessitate frequent readjustments thereof. Liquid absorbed by the liner or collecting between the liner blocks or blocks and drum may produce an unsanitary or undesirable condition or may contaminate other subsequently cut material.

I have discovered that the drum may be formed of material impervious to liquids or lined with material impervious to liquids and with the sections of the lining material so assembled as to prevent passage of liquid between the edges thereof into contact with the container. For example, aluminum, iron, Monel metal, hard rubber and various other materials impervious to liquid may serve as suitable material for the drum, while thin coatings of metal formed by electrolysis or by dipping, by blocked tin, hard rubber and similar materials impervious to liquid and having liquid tight meeting edges may be suitable as drum lining material. Furthermore, by providing a drum liner of material impervious to and not attacked by liquids employed therewith, material attackable by the liquids may be employed in the drum without producing an unsanitary or undesirable condition to exist as above mentioned, as may be illustrated by the accumulation of corroded iron back of a sectional liner.

I prefer to employ substantially the same system of construction in machines of sizes smaller than that herein illustrated. For example, in certain size machines I may, however, change the gearing and other parts as may be desired. For example, in a hand operated machine, I may substitute for the motor of the present machine, a fly wheel, shaft and crank and suitably connect the same to drive shafts similar to those herein shown.

The drum cutters, scraper and mixing means may all be readily cleaned and washed by placing cleaning liquid in the drum and rotating the drum and cutters. After thoroughly cleansing the same, the liquid may be discharged through the chute by actuation of the scraper. Due to the formation of the outer flanges on the drum which overlap the adjacent sides of the housing, liquid from the drum cannot penetrate into the housing, nor can grease, lubricants or other materials from the housing creep out and pass into the drum, or give the device an unsightly appearance.

Figure 13:
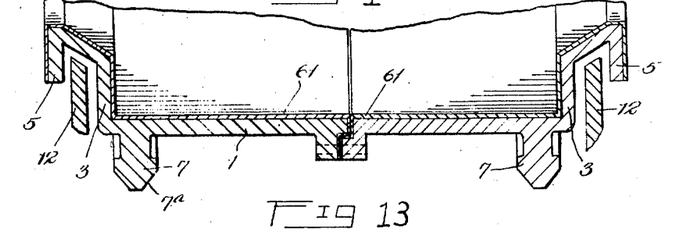
Fig. 13 is an enlarged fragmentary view showing one means of securing lining material in sheet form in the drum.

In Fig. 13 I have illustrated, fragmentally, a two part drum 1 as shown and described hereinabove, but provided with a sheet metal liner 61. This liner is formed in two or more parts and has its inner edges extended between the drum sections and are there clamped in place. Preferably the liners 61 are extended across the drum and over flanges 3 and 5. I prefer to make the liner 61 lie flat against the drum and flanges and to seal all cuts and meeting edges against the passage of liquid therebetween.

Certain parts and combinations of apparatus illustrated and described in this application, are the inventions I believe, of Edward Parker Burrell of Cleveland, Ohio, and are being claimed in his name in other applications co-pending herewith, including application Serial Number 86,380, filed Feb. 6th, 1926, and application Serial Number 86,771, filed Feb. 8, 1926.

Having thus described my invention so that those skilled in the art may be enabled to practice the same, what I desire to secure by Letters Patent is defined in what is claimed.

What is claimed is:

1. The method of cutting materials which comprises subjecting the material to be cut to centrifugal force in a vertical plane and simultaneously cutting almost but not entirely through and mixing the said material.

2. The method of cutting materials which comprises subjecting the material to be cut to centrifugal force in a substantially vertical plane, then simultaneously draw-cutting almost but not entirely through the mass of material and mixing the material without exerting substantial pressure thereon and finally removing the material from the influence of centrifugal force.

3. The method of cutting materials which comprises subjecting the materials to be cut to the influence of centrifugal force in a vertical plane and while still under the said influence cutting the material to substantially uniform size with simultaneous intermingling of the cut portions thereof and then mixing the cut material intimately and finally stopping the rotation of the cut and mixed material.

4. The method of uniformly cutting and intimately mixing material which comprises rotating the material to be cut in a substantially vertical plane under centrifugal force, and draw cutting and simultaneously intermingling the materials by moving the same transversely of the plane of rotation.

5. The method of cutting materials which comprises subjecting the material to be cut to centrifugal force in a substantially vertical plane, repeatedly cutting nearly but not entirely through the said material, repeatedly moving the material, throughout its entire depth transversely of the said vertical plane, and finally removing the material from the influence of the centrifugal force.

6. A cutting machine comprising in combination, a drum mounted for rotation in a fixed path about a horizontal axis in a manner to distribute material transversely more or less uniformly over the inner surface of the drum, the drum having material retaining side flanges extending toward the axis thereof, a shaft extending through the drum and supported at each end outside the drum and carrying cutting means, the said shaft being movable to bring the said cutting means into and out of cutting position between the said material retaining flanges, and means for simultaneously rotating the drum and cutting means and for moving the said shaft longitudinally thereof.

7. A cutting machine comprising in combination, a drum rotatable in a fixed path about a horizontal axis, the said drum having material retaining side flanges in the plane of the drum and extending toward the axis thereof, a rotatable and longitudinally movable shaft extending through the drum and carrying cutting discs movable into and out of cutting position between said side flanges and maintainable just out of contact with the inner surface of the drum, means for rotating the drum and means for simultaneously rotating the cutter shaft and moving the same longitudinally thereof, the peripheral speed of the discs being from about two to about thirty times the peripheral speed of the drum.

8. A cutting machine comprising in combination, a drum rotatable in a fixed path about a horizontal axis, a shaft extending through the drum and supported at each end, the said shaft carrying cutting discs, means for moving the said shaft and cutting discs into and out of cutting position between the said side flanges of the drum, means for preventing contact of the discs with the inner surface of the drum, and means to rotate the drum and simultaneously therewith to rotate the cutting means and move the shaft longitudinally thereof.

9. A cutting machine comprising in combination, a material retaining container rotatable in a fixed path about a horizontal axis, cutting discs movable toward and away from the inner surface of the said container, and means for simultaneously rotating the container and discs and for moving the discs traversely of the container, the said means being adjustable to vary the amount of the transverse movement of the said discs.

10. A cutting machine comprising a housing, cross shafts rotatably carried in the lower portions of the housing, a drum carried by the said cross shafts and mounted within the housing for rotation about a horizontal axis, means for rotating the said drum, a cutter shaft disposed within the drum, cutters mounted on the shaft, means supporting the cutter shaft, a combined cutter cover, hopper and baffle operatively associated with the said cutter shaft, means for moving the cutter shaft lengthwise thereof, means for moving the cutters toward and away from the inner surface of the drum, means for removing material from the inner surface of the drum and returning it thereto and means for discharging material from the drum.

11. A cutting machine comprising in combination, a drum mounted for rotation in a fixed path about a horizontal axis in a manner to distribute material transversely more or less uniformly over the inner surface of the drum, the said drum having material retaining side flanges extending toward the axis thereof, a shaft extending through the drum and supported at either end outside of the drum and carrying cutting means disposed between the said material retaining flanges, means to move the said shaft longitudinally thereof, and means to rotate the said cutting means and drum simultaneously, the cutting means being adjustable at will to a position just out of contact with the inner surface of the drum.

12. A cutting machine comprising in combination a material retaining container rotatable about a horizontal axis, means to rotate the said container, cutting means disposed in material cutting cooperation with but maintained out of substantial contact with the inner surface of the said container, adjustable means to fix the cutting means just out of contact with the inner surface of the container and means for actuating the said cutting means.

13. A cutting machine comprising in combination, a material retaining container mounted for rotation in a fixed path about a horizontal axis, a shaft within the drum and supported at each end, cutting means carried by the shaft, the said shaft being movable to bring the said cutting means into and out of cutting position with respect to the inner surface of the drum, the cutting means being capable of being fixed to rotate just out of contact with the inner surface of the container, and means for simultaneously rotating the drum and cutting means and for moving the said shaft longitudinally thereof.

14. A cutting machine comprising in combination, a material retaining container mounted for rotation in a fixed path about a horizontal axis at sufficient speed to carry material to be cut therewith, a shaft within the drum and supported at each end for rotation about a fixed horizontal axis and carrying cutting means, the said shaft being adjustably movable to bring the said cutting means into and out of cutting position with respect to the inner surface of the drum, means maintaining the said shaft in fixed position during rotation with the cutting means positioned just out of contact with the inner surface of the container, and means for simultaneously rotating the drum and cutting means.

15. A cutting machine comprising in combination, a material retaining container rotatable in a fixed path about a horizontal axis, cutting discs movable toward and away from the inner surface of the said container, means for simultaneously rotating the container and discs and for moving the discs transversely of the container, and means for adjustably fixing the discs to rotate just out of contact with the inner surface of the container.

16. A cutting machine comprising in combination a material retaining container rotatable about a fixed horizontal axis, a rotatable shaft supported at each end, and cutting means on the shaft adjustably fixed to rotate just out of contact with the inner surface of the container.

17. A cutting machine comprising in combination, a material retaining container rotatable about a fixed horizontal axis, cutting means in the container rotatable about a fixed axis, and means for initially setting and positively maintaining the cutting means just out of contact with the inner surface of the container during substantially the entire cutting operation.

18. In a cutting machine in combination, a material retaining container, disc cutters, the said container and cutters being mounted for rotation about fixed, parallel, horizontal axes, means to move the said axes relatively toward and away from each other, and means to adjust the relative positions of the said axes to position the cutters just out of contact with the inner surface of the container.

19. A cutting machine comprising in combination a material retaining container rotatable about a fixed horizontal axis, a shaft supported to rotate about an adjustably fixed axis, cutting means on the shaft, and means operatively associated with the said shaft and cutting means to maintain a predetermined clearance between the said cutting means and the inner surface of the container during substantially the entire cutting operation.

20. A cutting machine comprising in combination a material-retaining container rotatable in a fixed path about a horizontal axis, means to rotate the container, cutting means positioned to rotate just out of contact with the inner surface of the container, means maintaining the said relative positioning of the container and cutting means and maintaining a substantially constant clearance between the cutting means and the inner surface of the container, and means to rotate the cutting means.

21. The method of comminuting material consisting in subjecting a mass of material to centrifugal force against an abutment positioned in a vertical plane, bringing said material in operative comminuting contact with comminuting means held out of contact with said abutment and having a plurality of motions relative to the line of travel of said material, thereby reducing the said material to a comminuted condition.

22. The method of cutting material which comprises subjecting the material to centrifugal force in a vertical plane thereby maintaining it in the position desired for cutting, rotating the material while so positioned, and while so positioned passing cutting means having a plurality of movements relative to the said material into but not entirely through the material toward the material supporting means.

23. The method of cutting material which comprises subjecting the material to centrifugal force in a vertical plane thereby maintaining the material in the position desired for cutting, rotating the material while so positioned, and while so positioned passing cutting means into but not entirely through the material to the material supporting means.

24. The method of cutting material which comprises subjecting the material to centrifugal force in a vertical plane thereby maintaining the material in the position desired for cutting, rotating the material while so positioned, and while so positioned passing cutting means having a greater lineal speed than the lineal speed of the material into but not entirely through the material toward the material supporting means.

25. The method of comminuting material which consists of subjecting a mass of material to centrifugal force against an abutment positioned in a vertical plane, bearing said material into operative comminuting contact with narrow edged comminuting means held just out of contact with said abutment in a manner to reduce the material to a comminuted condition in which the comminuted particles are of a predetermined size.

In testimony whereof I hereunto affix my signature this 18th day of May, 1925.

GEORGE R. NAPIER.